US011330350B2

(12) United States Patent
Arai et al.

(10) Patent No.: US 11,330,350 B2
(45) Date of Patent: May 10, 2022

(54) FIELD DEVICE AND INFORMATION PROVIDING METHOD

(71) Applicant: Yokogawa Electric Corporation, Musashino (JP)

(72) Inventors: Takashi Arai, Tokyo (JP); Yusaku Yoshida, Tokyo (JP); Shuichi Sato, Tokyo (JP); Ikuhiko Ishikawa, Tokyo (JP)

(73) Assignee: Yokogawa Electric Corporation, Tokyo (JP)

(*) Notice: Subject to any disclaimer, the term of this patent is extended or adjusted under 35 U.S.C. 154(b) by 325 days.

(21) Appl. No.: 15/897,417

(22) Filed: Feb. 15, 2018

(65) Prior Publication Data

US 2018/0242055 A1 Aug. 23, 2018

(30) Foreign Application Priority Data

Feb. 20, 2017 (JP) .............................. JP2017-029121

(51) Int. Cl.
*H04Q 9/00* (2006.01)
*G01D 1/18* (2006.01)
*G01D 9/00* (2006.01)
*G05B 19/042* (2006.01)

(52) U.S. Cl.
CPC ................ *H04Q 9/00* (2013.01); *G01D 1/18* (2013.01); *G01D 9/00* (2013.01); *G05B 19/0423* (2013.01); *H04Q 2209/40* (2013.01)

(58) Field of Classification Search
CPC ........ G01D 1/18; G01D 9/00; G05B 19/0423; G05B 19/406; G05B 19/4185; H04W 4/38; H04Q 9/00; H04Q 2209/40

USPC .......................................................... 702/198
See application file for complete search history.

(56) References Cited

U.S. PATENT DOCUMENTS

| | | | |
|---|---|---|---|
| 5,745,049 A | 4/1998 | Akiyama et al. | |
| 2003/0051557 A1* | 3/2003 | Ishikawa ................. | G01F 1/588 |
| | | | 73/861.12 |
| 2005/0071113 A1* | 3/2005 | Heilig .................... | G01F 23/266 |
| | | | 702/127 |
| 2008/0208527 A1 | 8/2008 | Kavaklioglu | |
| 2009/0058696 A1* | 3/2009 | Baldwin .................. | G01H 1/16 |
| | | | 341/110 |
| 2012/0011180 A1 | 1/2012 | Kavaklioglu | |
| 2014/0122800 A1 | 5/2014 | Williams | |
| 2015/0088279 A1 | 3/2015 | Miller et al. | |

(Continued)

FOREIGN PATENT DOCUMENTS

| | | | | |
|---|---|---|---|---|
| EP | 3364259 A1 * | 8/2018 | ............... | G01D 1/18 |
| JP | 7-5053 A | 1/1995 | | |

(Continued)

*Primary Examiner* — Michael P Nghiem
(74) *Attorney, Agent, or Firm* — Sughrue Mion, PLLC

(57) ABSTRACT

A field device according to one aspect of the present invention includes a plurality of types of sensors, at least one converter configured to acquire measured results of the plurality of types of sensors and to convert the measured results into measured information, the measured information being a physical quantity, and an information providing device configured to acquire and store the measured information from the at least one converter and to provide the stored measured information to an outside of the field device in a case that a predetermined condition is satisfied.

20 Claims, 7 Drawing Sheets

(56) References Cited

U.S. PATENT DOCUMENTS

| | | | |
|---|---|---|---|
| 2017/0131705 A1* | 5/2017 | Ishii | G05B 19/4184 |
| 2017/0279457 A1* | 9/2017 | Yoshida | G01F 1/32 |
| 2019/0078915 A1* | 3/2019 | Mitsutake | G01F 25/0007 |
| 2020/0010138 A1* | 1/2020 | Nishihara | G07C 5/006 |

FOREIGN PATENT DOCUMENTS

| | | | |
|---|---|---|---|
| JP | 09033298 A | 2/1997 |
| JP | 2003-65816 A | 3/2003 |
| JP | 2003131707 A | 5/2003 |
| JP | 5049956 B2 | 10/2012 |
| JP | 2015533006 A | 11/2015 |

* cited by examiner

FIELD DEVICE AND INFORMATION PROVIDING METHOD

BACKGROUND OF THE INVENTION

Field of the Invention

The present invention relates to a field device and an information providing method.

The present application claims priority based on Japanese patent application 2017-029121, filed on Feb. 20, 2017 and includes herein by reference the content thereof.

Description of Related Art

In a plant, a factory, or the like, a field device (a measuring device or an actuator) referred to as a field device has been used. The field device measures, for example, a measuring target (for example, a fluid and the like) and transmits a measured value (flow rate, pressure, temperature, and the like) to an external device. The external device performs an abnormality diagnosis based on the measured value received from the field device (for example, refer to Japanese Patent No. 5049956).

SUMMARY OF THE INVENTION

In a measuring system in the related art, when measurement performed by various types of measuring devices, for example, a wire such as a transmission line 95 for transmitting a measured value measured by a measuring device to a recorder 85 is required for every measuring device as in a measuring system 2 shown in FIG. 7. For example, as shown in FIG. 7, measuring devices such as a flowmeter 15, a temperature sensor 30b, a pressure sensor 30c, a conductivity sensor 30d, and a pH sensor 30e may be mounted on a pipe 50 through which a fluid flows inside, and measured values measured by each of the measuring devices are transmitted to the recorder 85 via the transmission line 95. As described above, when measurement is perforated by various types of measuring devices in a conventional measuring system, it is necessary to form a wire such as the transmission line 95 for every measuring device, and thus there are cases in which costs for wiring work are increased.

One aspect of the present invention provides a field device and an information providing method which can reduce costs for wiring.

A field device according to a first aspect of the present invention may include a plurality of types of sensors, at least one converter configured to acquire measured results of the plurality of types of sensors and to convert the pleasured results into measured information, the measured information being a physical quantity, and an information providing device configured to acquire and store the measured information from the at least one converter and to provide the stored measured information to an outside of the field device in a case that a predetermined condition is satisfied.

In the above described field device, the information providing device may include a communicator configured to transmit the measured information as a radio signal.

In the above described field device, the information providing may include an external input to which an external sensor is connectable.

In the above described field device, the information providing device may include a statistical processor configured to perform statistical processing using the acquired measured information. The information providing device may be configured to provide statistical processing information based on a result of the statistical processing performed by the statistical processor to an outside of the field device.

In the above described field device, the information providing device may be configured to acquire the measured information of the plurality of types of sensors at the same time.

In the above described field device, the condition may be that predetermined time has arrived.

In the above described field device, the condition may be that a predetermined period of time has elapsed.

In the above described field device, the condition may be that an information transmission request from an outside of the field device has been received.

In the above described field device, the plurality of types of sensors may include at least two of a flow sensor, a temperature sensor, a pressure sensor, a conductivity sensor, and a pH sensor.

In the above described field device, the plurality of types of sensors may include a first sensor and a second sensor, a type of the first sensor being different from the second sensor. The at least one converter may include a first converter configured to acquire a first measured result of the first sensor and to convert the first measured result into first measured information, the first measured information being a physical quantity, and a second converter configured to acquire a second measured result of the second sensor and to convert the second measured result into second measured information, the second measured information being physical quantity. The statistical processor may be configured to perform the statistical processing using the first measured information and the second measured information.

In the above described field device, the first sensor may be a flow sensor and the second sensor may be a temperature sensor.

In the above described field device, the statistical processor may be configured to perform a multiple regression calculation using the first measured information and the second measured information.

An information providing method according to a second aspect of the present invention may include acquiring measured results of a plurality of types of sensors provided in a field device, converting the measured results into measured information, the measured information being a physical quantity, storing the measured information, and providing the stored measured information to an outside of the field device in a case that a predetermined condition is satisfied.

In the above described information providing method, providing the stored measured information to the outside of the field device array include transmitting the measured information as a radio signal.

The above described information providing method may further include acquiring a measured result from an external sensor.

The above described information providing method may further include performing statistical processing using the measured information, and providing statistical processing information based on a result of the statistical processing to an outside of the field device.

In the above described information providing method, storing the measured information may include acquiring the measured information of the plurality of types of sensors at the same time and storing the acquired measured information.

In the above described information providing method, the condition may be that a determined time has arrived.

In the above described information providing method, the condition may be that a predetermined period of time has elapsed.

In the above described information providing method, the condition may be that an information transmission request from an outside of the field device has been received.

According to the one aspect of the present invention, it is possible to provide a field device and an information providing method which can reduce costs for wiring.

DETAILED DESCRIPTION OF THE INVENTION

First Embodiment

Hereinafter, a measuring system 1 according to a first embodiment of the present invention will be described with reference to drawings.

Figure 1:
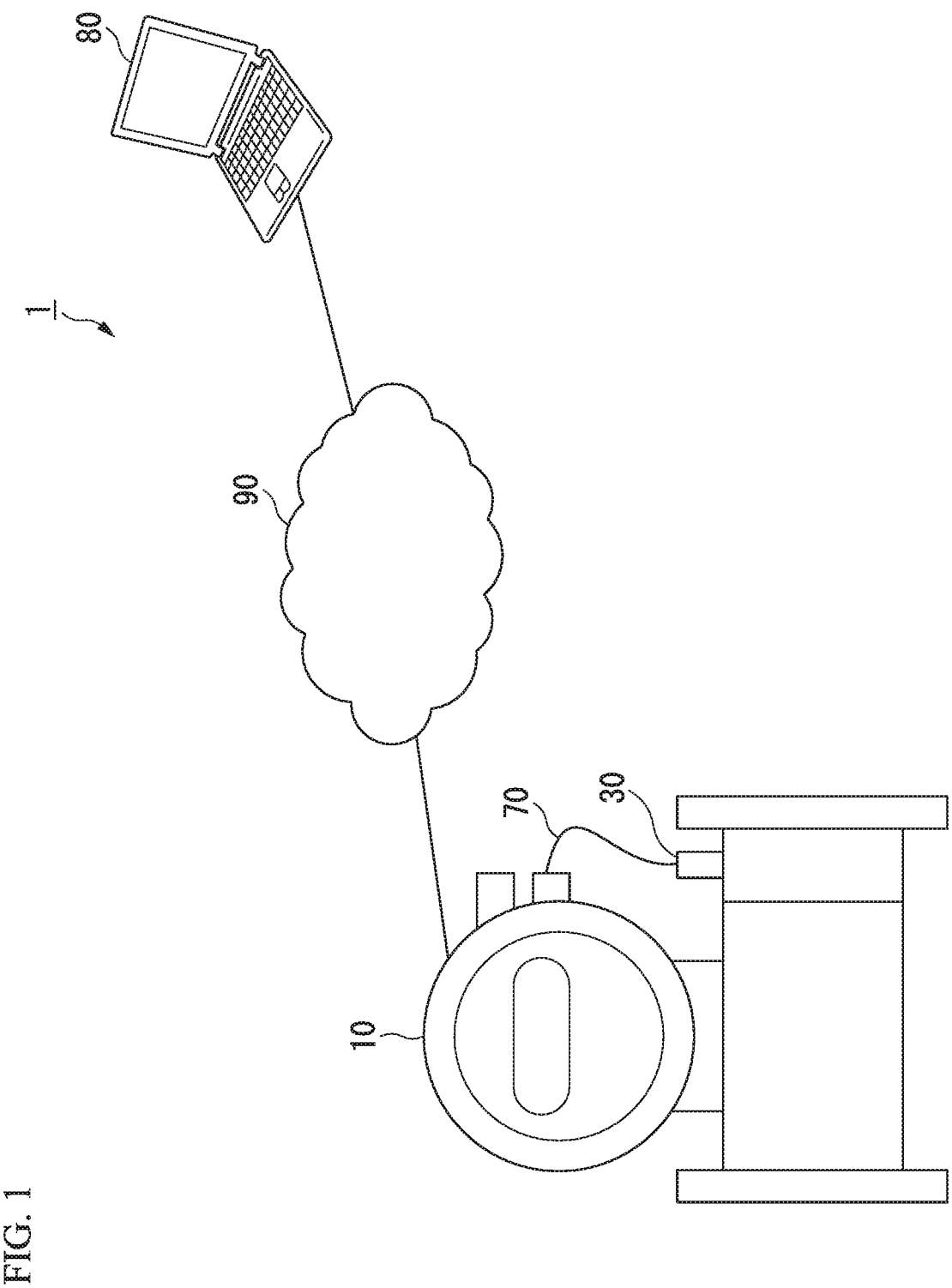
FIG. 1 is a schematic diagram which schematically shows a configuration of a measuring system according to a first embodiment of the present invention.

FIG. 1 is a schematic diagram which schematically shows a configuration of a measuring system according to the first embodiment of the present invention. As shown in the drawing, the measuring system 1 includes a field device 10, a terminal 80, and a communication network 90. In addition, the field device 10 includes a sensor 30 and a transmission line 70.

The field device 10 is a measuring device which performs measurement on a measuring target. In the present embodiment, the field device 10 is a measuring device in which a flow sensor for measuring a flow rate of a fluid flowing in a pipe (not shown) is built into a main body of the field device 10. The field device 10 is installed in a pipe laid in, for example, a plant or the like.

The sensor 30 may be a different type of sensor from the flow sensor described above, such as, a temperature sensor, a pressure sensor, a conductivity sensor, a pH sensor, or the like.

The main body of the field device 10 and the sensor 30 are connected via the transmission line 70. In FIG. 1, the transmission line 70 is wired through the main body of the field device 10 and the outer side of the sensor 30, but is not limited thereto. The transmission line 70 may be wired through the inside of a device such as the field device 10.

The transmission line 70 includes, for example, a transmission line used for transmitting an analog signal of "4 to 20 mA", a transmission line used for transmitting a pulse signal of "0 to 1 kHz", and a transmission line used for transmitting a high signal/low signal by turning on; off a contact point (not shown) provided in the field device 10.

The field device 10 may be communicatively connected using, for example, a wired industrial network conforming to HART®, Field Bus, or the like, or a wireless industrial network conforming to ISA100.11a, Wireless HART®, or the like.

The field device 10 can store measured result information based on a measured value of a measured flow rate and measured result information based un measured values (for example, a temperature, a pressure value, conductivity, a pH value, and the like) acquired from the sensors 30. The field device 10 can perform various types of statistical processing using the stored measured result information and store statistical information based on a result of the statistical processing.

The terminal 80 is a computer device, for example, a personal computer. The field device 10 and the terminal 80 are communicatively connected via the communication network 90 (for example, the Internet, a local area network (LAN), or the like). The terminal 80 receives information transmitted from the field device 10, for example, measured result information based on a measured value of a flow rate measured by the field device 10, measured result information based on measured values measured by various types of sensors 30 (for example, a temperature, a pressure value, a conductivity, a pH value, and the like), and statistical information based on a result of the statistical processing described above, and displays them.

The transmission of information from the field device 10 to the terminal 80 may be performed when a request is made from the terminal 80 to the field device 10, and may be performed periodically by the field device 10 itself.

Figure 7:
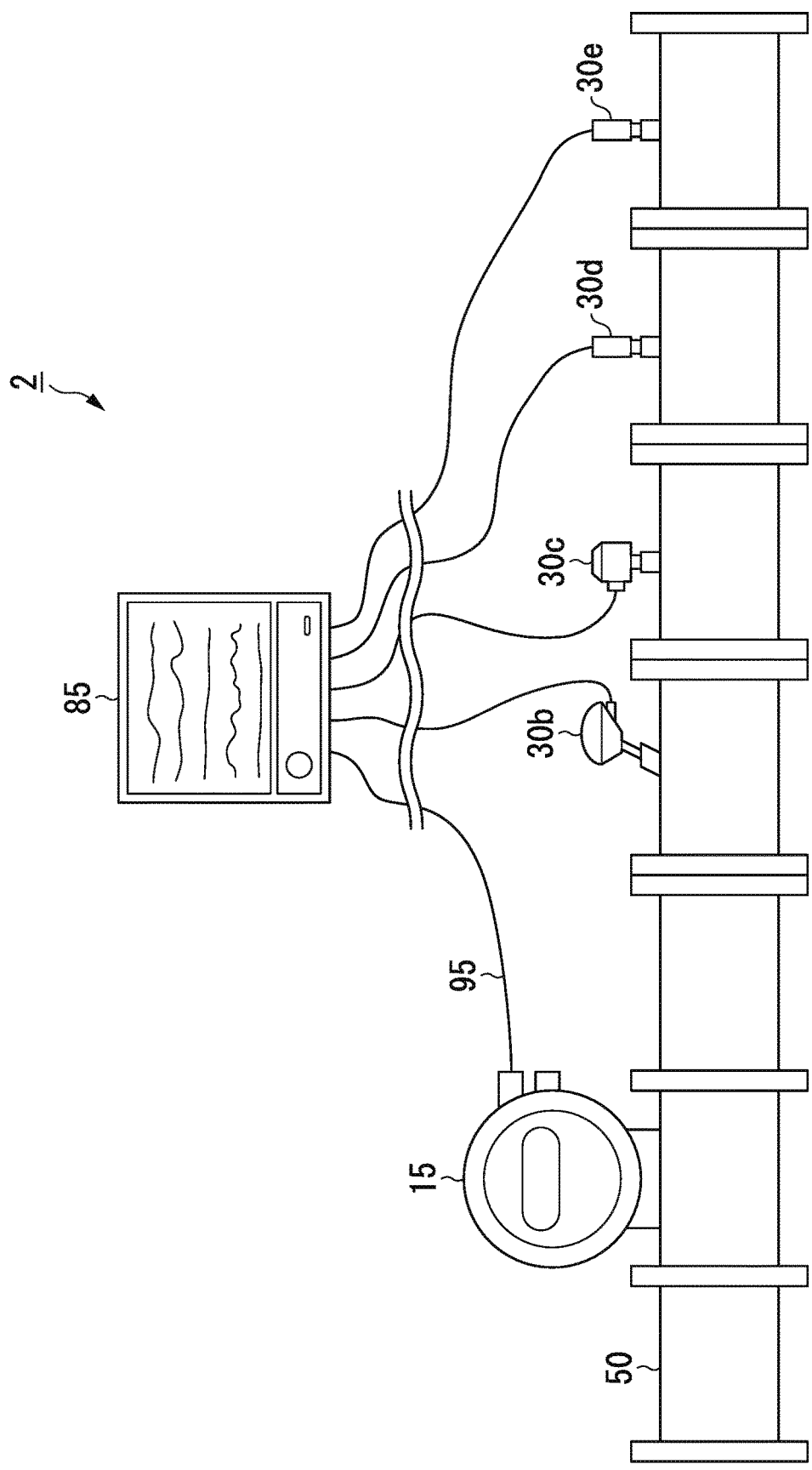
FIG. 7 is a schematic diagram which schematically shows a configuration of a conventional measuring system.

As described above, in the measuring system 1 according to the first embodiment of the present in ion, the field device 10 includes various types of sensors (for example, a flow sensor, a temperature sensor, a pressure sensor, a conductivity sensor, a pH sensor, and the like). Accordingly, in the measuring system 1 according to the first embodiment of the present invention, for example, as in a conventional measuring system 2 shown in FIG. 7, it is not necessary to perform wiring using a transmission line 95 and the like between each sensor (the temperature sensor 30b, the pressure sensor 30c, the conductivity sensor 30d, the pH sensor 30e, and the like) and the recorder 85.

As described above, in the measuring system 1 according to the first embodiment of the present invention, the field device 10 can store measured result information based on measured values measured by sensors included in the field device 10 itself. Furthermore, the field device 10 can perform various types of statistical processing using stored measured result information of these. In the measuring system 1 according to the first embodiment of the present invention, it is not necessary to install an external device such as the recorder 85 to store measured values therein or to cause the external device to perform statistical processing, for example, as in the conventional measuring system 2 shown in FIG. 7.

Hereinafter, an outline of the configuration of the field device 1 will be described with reference to drawings.

Figure 2:
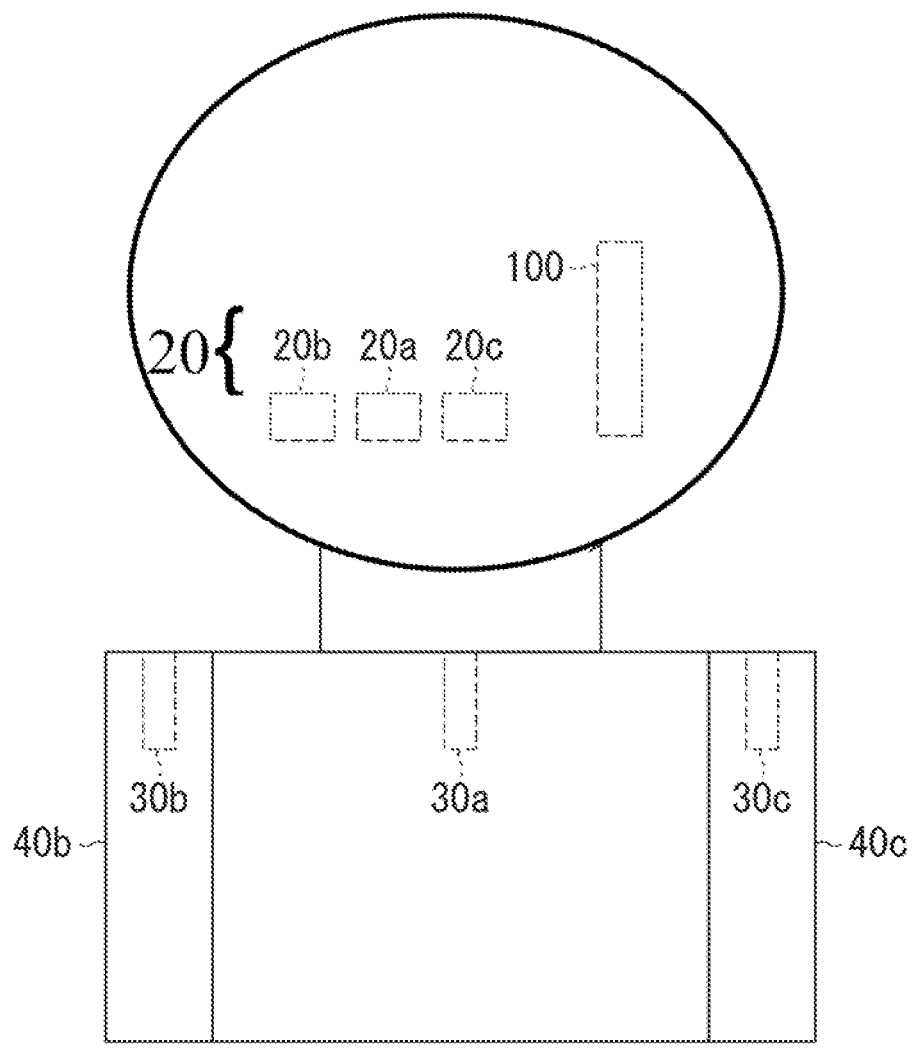
FIG. 2 is a schematic diagram which schematically shows a configuration of a field device according to the first embodiment of the present invention.

FIG. 2 is a schematic diagram which schematically shows the configuration of the field device according to the first embodiment of the present invention. As shown in the drawing, the field device 10 includes converters 20 (20a, 20b, and 20c), sensors 30 (30a, 30b, and 30c), sensor mounting portions 40 (40b and 40c), and a server board 100.

The converters 20 (20a, 20b, and 20c) are devices which convert measured values measured by the sensors 30 into measured result information that is a physical quantity, for example, analog/digital (A/D) converters and the like.

A plurality of A/D converters associated with respective converters 20 (20a 20b, and 20c) may be provided, and one A/D converter associated with respective converters 20 (20a, 20b, and 20c) may be provided.

The converters 20 (20a, 20b, and 20c) may include an A/D converter and a processor (arithmetic device), and an output value of the A/D converter may be arithmetically processed and converted into measured result information which is a physical quantity in the processor. In this case, a plurality of processors associated with respective converters 20 (20a, 20b, and 20c) may be provided, and one processor associated with respective converters (20a, 20b, and 20c) may be provided.

The sensors 30 (30a, 30b, and 30c) are various types of sensors which measure a fluid flowing in a pipe (not shown) which is a measuring target. Three sensors 30 shown in FIG. 2 are a flow sensor 30a, a temperature sensor 30b and a pressure sensor 30c. Measured values measured by the flow sensor 30a, the temperature sensor 30b, and the pressure sensor 30c are converted into measured result information which is a physical quantity by the converter 20a, the converter 20b and the converter 20c, respectively.

The sensor mounting portion 40b and the sensor mounting portion 40c are members for allowing mounting of each of the sensor 30b and the sensor 30c on a main body of the field device 10. The sensor mounting portion 40 does not need to be a member exclusively provided for mounting the sensor 30. For example, various types of sensors 30 may be mounted on a ground ring or the like connected to the main body of a flowmeter.

The server hoard 100 (information providing device) can store the measured result information converted by the converter 20. Furthermore, the server board 100 can perform statistical processing using the stored measured result information and store statistical information which is a result of the statistical processing. The server board 100 can transmit the stored measured result information and the stored statistical information to the terminal 80 via the communication network 90.

[Configuration of the Field Device]

Hereinafter, an example of a functional configuration of the field device 10 will be described with reference to drawings.

Figure 3:
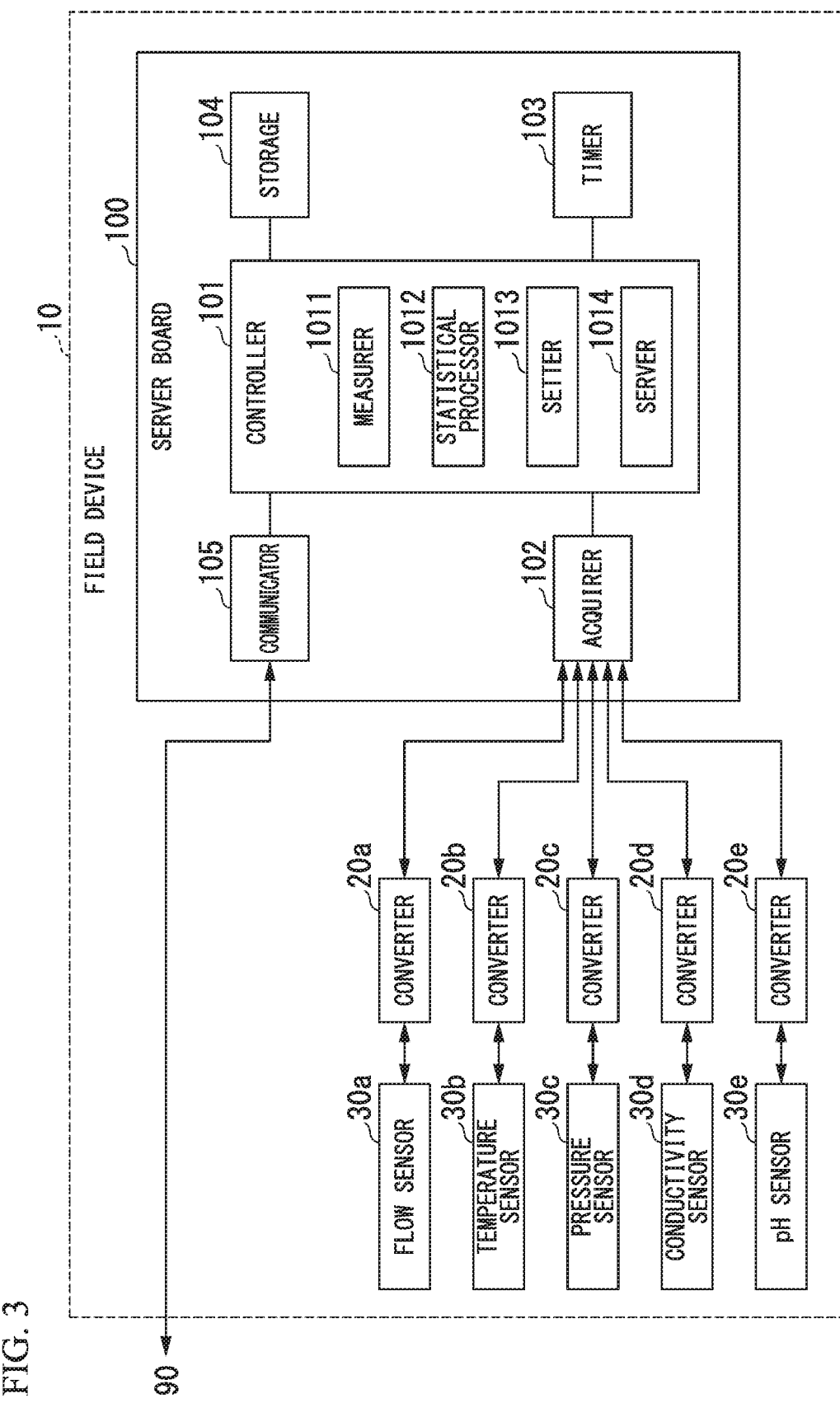
FIG. 3 is a block diagram which shows a functional configuration of the field device according to the first embodiment of the present invention.

FIG. 3 is a block diagram which shows a functional configuration of the field device according to the first embodiment of the present invention. As shown, in the drawing, the field device 10 includes a server board 100, the flow 30a, the temperature sensor 30b, the pressure sensor 30c, the conductivity sensor 30d, a pH sensor 30e, and the converters 20 (20a, 20b, 20c, 20d, and 20e). The server board 100 includes a controller 101, an acquirer 102, a timer 103, a storage 104, and a communicator 105. The controller 101 includes a measurer 1011, a statistical processor 1012, a setter 1013, and a server 1014.

The server board 100 is, for example, an electronic circuit board (motherboard) having a server function.

The controller 101 controls various types of processing in the server board 100. The controller 101 includes, for example, a central processing unit (CPU).

The measurer 1011 operates periodically (for example, every "50 msec") on the basis of a signal from the timer 103 to be described below, and acquires measured result information based on a measured value measured by various types of sensors 30 (the flow sensor 30a, the temperature sensor 30b, the pressure sensor 30c, the conductivity sensor 30d, and the pH sensor 30e) from the converters 20 (20a, 20b, 20c, 20d, and 20e). The measurer 1011 causes the acquired measured result information to be stored in the storage 104 to be described.

The measurer 1011 may acquire measured information of a plurality of types of sensors at the same time on the basis of a signal from the timer 103.

The statistical processor 1012 performs statistical processing using the measured result information stored in the storage 104. The statistical processor 1012 causes statistical information based on a result of the statistical processing to be stored in the storage 104.

The setter 1013 performs processing related to settings of various types, such as setting parameters for measurement and updating firmware, required for measurement of a measuring target (fluid) by various types of sensors 30 (the flow sensor 30a, the temperature sensor 30b, the pressure sensor 30c, the conductivity sensor 30d, and the pH sensor 30e).

The server 1014 transmits the measured result information and statistical information stored in the storage 104 to the terminal 80 via the communicator 105 to be described.

The acquirer 102 is a communication interface for communicative connection between the server board 100 and each of the converters 20 (20a, 20b, 20c, 20d, and 20e). The acquirer 102 acquires measured result information obtained by converting measured values measured by the sensors 30 (the flow sensor 30a, the temperature sensor 30b, the pressure sensor 30c, the conductivity sensor 30d, and the pH sensor 30e) using the converters 20 (20a, 20b, 20c, 20d, and 20e), respectively. The controller 101 acquires measured result information from the acquirer 102.

The timer 103 generates a signal periodically (for example, every "50 msec") and outputs the signal to the measurer 1011, thereby operating the measurer 1011 periodically. The timer 103 can count a current time.

The storage 104 stores measured result information acquired by the measurer 1011. In addition, the storage 104 stores statistical information generated by the statistical processor 1012.

The storage 104 includes a storage medium such as a hard disk drive (HDD), flash memory, an electrically erasable programmable read only memory (EEPROM), a random access read/write memory (RAM), a read only memory (ROM), or an arbitrary combination of these storage mediums.

The communicator 105 is a communication interface for communicative connection with the terminal 80 via the communication network 90. The communicator 105 is communicatively connected to the communication network 90 via wireless communication, and transmits the measured result information and the statistical information stored in e storage 104 to the terminal 80 (external device) based on the instruction from the server 1014. The wireless communication herein is wireless communication conforming to a wireless communication standard such as Wi-Fi®, WiMAX®, or 3G/LTE®.

In the present embodiment, the communicator 105 is communicatively connected to the communication network 90 via wireless communication, but the communicator 105 may be communicatively connected to the communication network 90 via wired communication.

For example, when at least one of conditions is satisfied, such as that a predetermined time has arrived, that a predetermined period of time (for example, an elapsed time from a time at which the communicator 105 has provided measured result information and statistical information of a previous time to the outside) has elapsed, and that an information transmission request from the outside has been received, the communicator 105 may provide acquired measured result information and statistical information indicating a measured result to the outside on the basis of an instruction input from the server 1014.

The converter 20a acquires a measured value measured by the flow sensor 30a included in its own field device 10 from the flow sensor 30a on the basis of a request from the acquirer 102. The converter 20a converts the acquired measured value into measured result information which is a physical quantity, and outputs a result to the acquirer 102 of the server board 100.

In the same manner, the converter 20b, the converter 20c, the converter 20d, and the converter 20e acquire measured values measured by the sensors 30 (the temperature sensor 30b, the pressure sensor 30c, the conductivity sensor 30d, and the pH sensor 30e) included in their own field devices 10 from respective sensors 30 on the basis of a request from the acquirer 102. The converter 20b, the converter 20c, the converter 20d, and the converter 20e convert the acquired measured, values into measured result information which is a physical quantity, respectively, and output the measured result information to the acquirer 102 of the server board 100.

The flow sensor sores the flow rate of a fluid (measuring target) flowing in a pipe (not shown) on the basis of a request from the measurer 1011, and outputs a measured value which is a result of the measurement to the converter 20a.

In the same manner, the temperature sensor 30b, the pressure sensor 30c, the conductivity sensor 30d, and the pH sensor 30e measure a temperature, a pressure, conductivity, and a pH value of a fluid (measuring target) flowing in a pipe (not shown), respectively, on the basis of a request from the measurer 1011, and output measured values which are results of the measurements to the converter 20b, the converter 20c, the converter 20d, the converter 20e, respectively.

In the present embodiment, the converters 20 (20a, 20b, 20c, 20d, and 20e) which convert measured values measured by various types of sensors 30 (the flow sensor 30a, the temperature sensor 30b, the pressure sensor 30c, the conductivity sensor 30d, and the pH sensor 30e) mounted on the field device 10 into measured result information which is a physical quantity are included in the main body of the field device 10, but the present embodiment is not limited thereto. The converters 20 (20a, 20b, 20c, 20d, and 20e) may be included in, for example, respective sensors 30 (the flow sensor 30a, the temperature sensor 30b, the pressure sensor 30c, the conductivity sensor 30d, and the pH sensor 30e).

Hereinafter, an example of a method of mounting various types of sensors 30 on the main body of the field device 10 will be described with reference to drawings.

Figure 4:
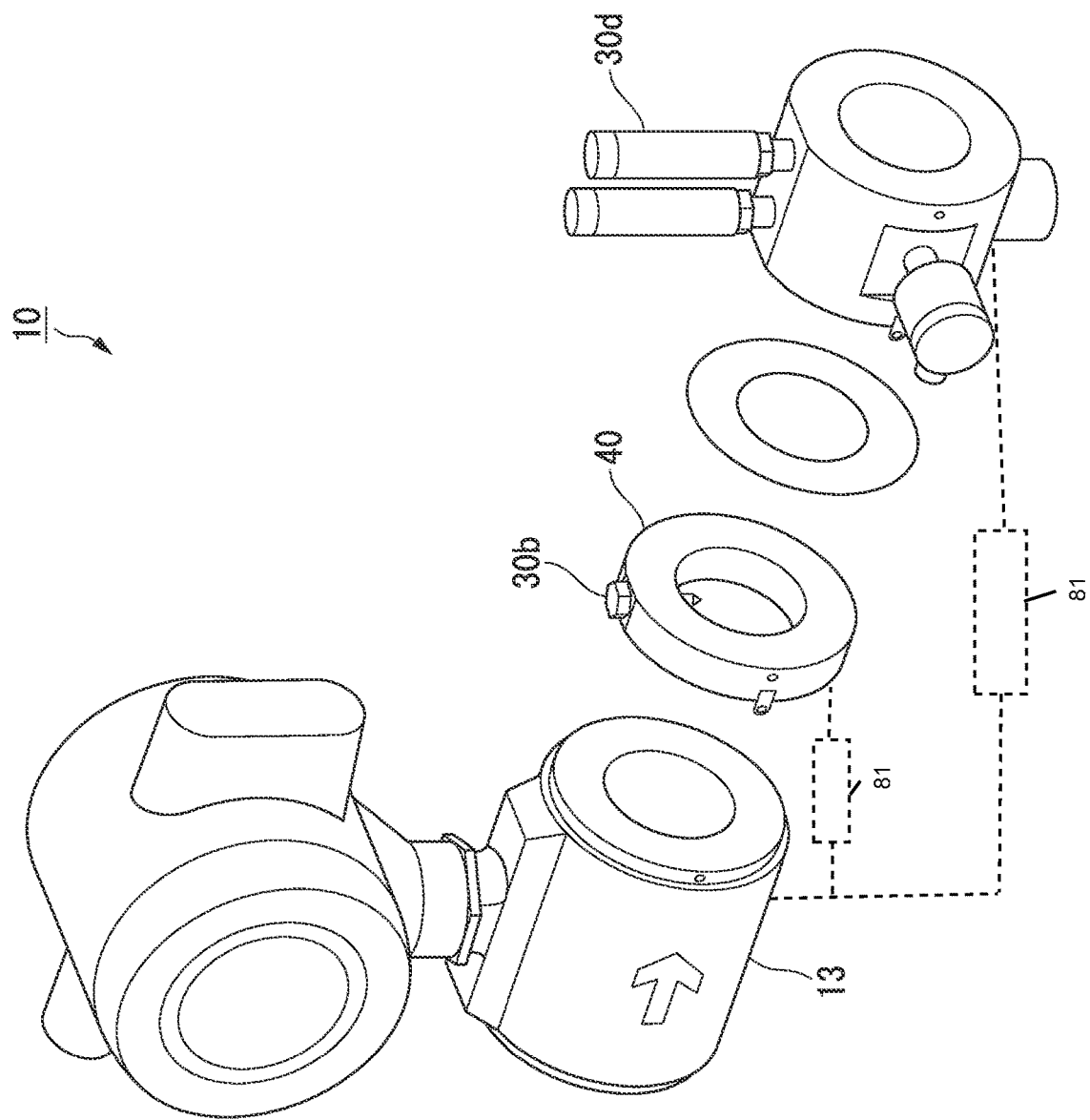
FIG. 4 is a diagram which shows an example of connection between the field device and a measuring device according to the first embodiment of the present invention.

FIG. 4 is a diagram which shows an example of connection between the field device and the measuring device according to the first embodiment of the present invention. As shown in the drawing, the temperature sensor 30b is mounted on the sensor mounting portion 40 (ground ring) and the sensor mounting portion 40 is connected to the main body 13 of the field device 10, and thereby the main body 13 of the field device 10 and the temperature sensor 30b are communicatively connected. Specifically, for example, a data input/output terminal 81 which is a communication interface is provided at a junction between the main body 13 of the field device 10 and the sensor mounting portion 40. Wires are preliminarily formed inside the main body 13 of the field device 10 and inside the sensor mounting portion 40. Thus the main body 13 of the field device 10 and the sensor mounting portion 40 are connected. As a result, the main body 13 of the field device 10 and the temperature sensor 30b are communicatively connected by data input/output terminals 81 of these being connected to each other.

Furthermore, as shown in the drawing, the sensor mounting portion 40 and a conductivity meter including the conductivity sensor 30d may be connected, and the main body 13 of the field device 10 and the conductivity sensor 30d may be communicatively connected by the sensor mounting portion 40 and the conductivity meter being connected. Specifically, for example, a data input/output terminal 81 which is a communication interface is provided at a junction between the sensor mounting portion 40 and the conductivity sensor 30d. Wires are preliminarily formed inside the sensor mounting portion 40 and inside the conductivity meter. Thus the main body 13 of the field device 10, the sensor mounting portion 40, and the conductivity meter are connected. As a result, the main body 13 of the field device 10 and the conductivity sensor 30d are communicatively connected via the sensor mounting portion 40 by data input/output terminals 81 of these being connected to each other.

According to the field device 10 as described above, one or a plurality of various types of sensors 30 may be arbitrarily mounted on the main body 13 of the field device 10 without wiring. According to the field device 10 described above, it is possible to easily perform rearrangement of the sensors 30 mounted on the main body 13 of the field device 10.

[Operation of the Server Board]

Hereinafter, an example of an operation of the server board 100 will e described with reference to drawings.

Figure 5:
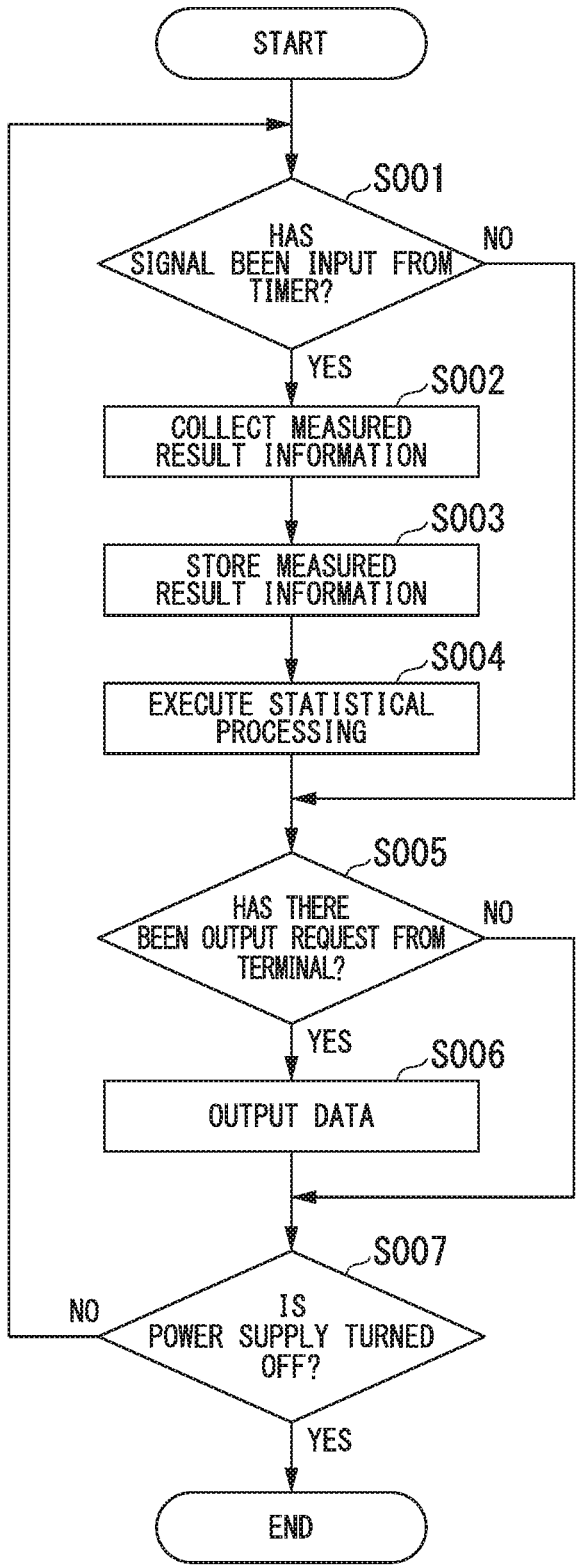
FIG. 5 is a flowchart which shows an example of an operation of a server board according to the first embodiment of the present invention.

FIG. 5 is a flowchart which shows an example of the operation of the server board according to the first embodiment of the present invention. The present flowchart starts when a power supply of the field device 10 is turned on.

(Step S001) When the measurer 1011 detects an input of a signal periodically output from the timer 103, the procedure proceeds to step S002. Otherwise (that is, when an input of the signal is not detected), the procedure proceeds to step S005.

(Step S002) The measurer 1011 collects measured result information based on measured values measured by various types of sensors 30 from the converters 20. Thereafter, the procedure proceeds to step S003.

(Step S003) The measurer 1011 causes the measured result information acquired in step S002 to be stored in the storage 104. Thereafter, the procedure proceeds to step S004.

(Step S004) The processor 1012 performs statistical processing using the measured result information stored in the storage 104 in step S003. Then, the statistical processor 1012 causes statistical information which is a result of the statistical processing to be stored in the storage 104. Thereafter, the procedure proceeds to step S005.

(Step S005) When the communicator 105 receives information indicating an output request transmitted from the terminal 80 via the communication network 90, the communicator 105 outputs the information indicating an output request to the server 1014, and the procedure proceeds to step S006. Otherwise (that is, when the information indicating an output request is not received), the procedure proceeds to step S007.

(Step S006) The server 1014 acquires information stored in the storage 104 (that is, at least one of the measured result information and the statistical information) on the basis of the information indicating an output request input in step S005. The server 1014 generates output data to be output to the terminal 80 (external device), and outputs the output data to the communicator 105 on the basis of the acquired information. The communicator 105 is communicatively connected to the communication network 90 via wireless communication and outputs output data input from the server 1014 to the terminal 80 (external device). Thereafter, the procedure proceeds to step S007.

(Step S007) When the power supply of the field device 10 is turned off, processing of the present flowchart ends. Otherwise (that is, when the power supply of the field device 10 remains in an on state), the procedure returns to step S007.

Second Embodiment

Hereinafter, a field device 11 according to a second embodiment of the present invention will be described with reference to drawings.

Figure 6:
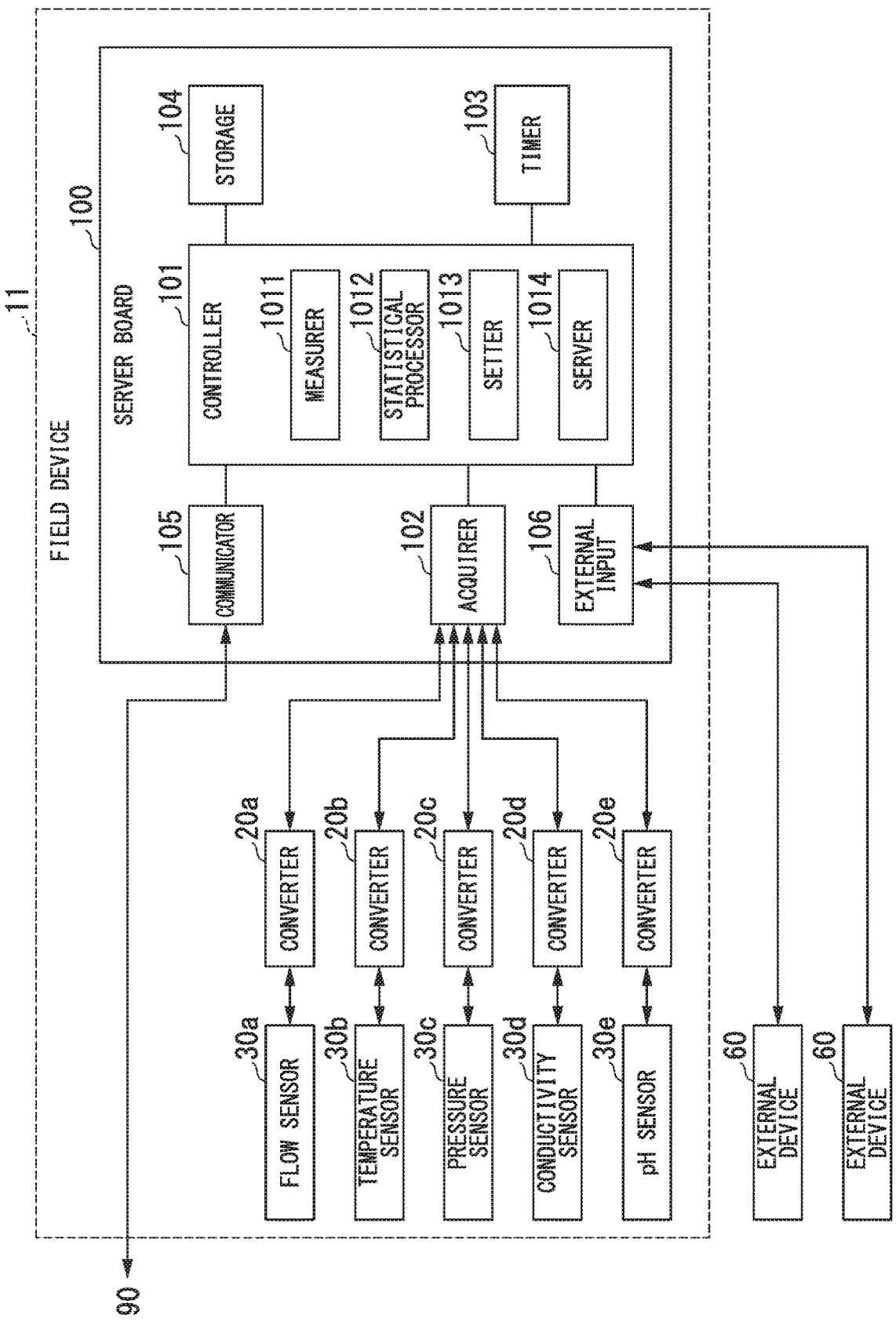
FIG. 6 is a block diagram which shows a functional configuration of a field device according to a second embodiment of the present invention.

FIG. 6 is a block diagram which shows a functional configuration of the field device according to the second embodiment of the present invention. Functional blocks having the same configuration as the functional blocks in the field device 10 according to the first embodiment will be given the same reference numerals, and description thereof will be omitted.

As shown in the drawing, the field device 11 includes an external input 106 which acquires measured values output from one or a plurality of external devices 60 (for example, measured result information and the like based on measured values measured by external measuring devices which are not directly connected to the field device 11). The external input 106 is a communication interface communicative connection to the external device 60.

The controller 101 causes measured result information acquired by the external input 106 to be stored in the storage 104. Accordingly, the statistical processor 1012 can perform statistical processing using measured result information including the measured result information stored in the storage 104 and acquired from the external device 60, and generate statistical information.

According to the field device 11 according to the second embodiment of the present invention, it is possible to perform statistical processing with not only measured result information based on measured values measured by the sensors 30 (the flow sensor 30a, the temperature sensor 30b, the pressure sensor 30c, the conductivity sensor 30d, and the pH sensor 30e) included in the field device 11 itself but also measured result information acquired from various types of external devices 60, and to generate statistical information.

(Example of Statistical Processing)

Hereinafter, an example of statistical processing performed by the statistical processor 1012 will be described.

The statistical processor 1012 calculates a management indicator using the measured result information stored in the storage 104. The management index is an index used for a diagnosis in a plant, and indicates, for example, a lining thinning amount of pipes in a plant, or a quality or a yield of a product.

The statistical processor 1012 calculates a management index by performing a multiple regression analysis using the measured result information acquired from the storage 104 (for example, flow rate data indicating the flow rate of a fluid in a pipe, and temperature data indicating a temperature of a fluid in a pipe).

Specifically, the statistical processor 1012 performs a multiple regression calculation using a coefficient calculated by performing a multivariate analysis in advance, measured result information (flow rate data and temperature data) acquired from the storage 104, and measured result information input to the external input 106. The statistical processor 1012 calculates a management index (for example, a lining thinning amount of pipes in a plant an index indicating a quality or yield of a product) by performing the multiple regression calculation.

Hereinafter, as a management index Y, a case of calculating the lining thinning amount of pipes will be described. "Lining thinning amount" is a management index indicating a thinning amount [mm/year] of a coating member inside a pipe.

The statistical processor 1012 acquires measured result information based on a measured value of a flow rate measured by the flow sensor 30a, measured result information based on a measured value of a temperature measured by the temperature sensor 30b, and measured result information based on a measured value of slurry hardness transmitted from the external device 60 from the storage 104. The external device 60 may be another field device which measures slurry hardness in pipes, or may be an input device such as a keyboard for receiving an input of slurry hardness from a user.

The statistical processor 12 performs a multiple regression calculation using a multiple regression equation. The multiple regression equation is represented as in the following Equation (1). In Equation (1), coefficients A0 to A3 are values calculated by performing, with the statistical processor 1012, multivariate analysis in advance, and are stored in the storage 104.

$$Y = A0 + A1 \cdot X1 + A2 \cdot X2 + A3 \cdot X3 \qquad \text{Equation (1)}$$

The statistical process 1012 reads the coefficients A0 to A3, measured result information X1 based on the measured value of a flow rate, measured result information X2 based on the measured value of a temperature, and measured result information X3 based on the measured value of slurry hardness from the storage 104, and calculates the thinning lining amount data Y as a management index. The statistical processor 1012 causes the calculated management index Y to be stored in the storage 104. As a result, for ample, a plant operator can ascertain the lining thinning amount by performing an output request from the terminal 80 and acquiring the management index Y.

The statistical processor 1012 determines a state of a plant on the basis of the calculated management index (the lining thinning amount data Y). For example, the statistical processor 1012 determines state levels of pipes in the plant on the basis of the following determination criteria (a) to (e), and derives level data LD indicating the determined state level. Threshold values TH1 to TH4 are threshold values set in advance in accordance with a thickness of a Lining, and have magnitudes as TH1<TH2<TH3<TH4.

(a) In the case of $Y \leq TH1$: Determination level 1
(b) In the ease of $TH1 < Y \leq TH2$: Determination level 2
(c) In the case of $TH2 < Y \leq TH3$: Determination level 3
(d) In the case of $TH3 < Y \leq TH4$: Determination level 4
(e) In the case of $TH4 < Y$: Determination level 5

The statistical processor 1012 causes the derived level data LD to be stored in the storage 104. Accordingly for example, a plant operator can ascertain a state of pipes by performing an output request from the terminal 80 and checking a state level of the pipes by acquiring the level data LD.

The management index Y calculated by the statistical processor 1012 is not limited to lining thinning amount data. For example, the statistical processor 1012 may calculate quality data of a product as the management index Y. In this case, the statistical processor 1012 calculates the quality data Y of a product on the basis of the following Equation (2).

$$Y = A0 + A1 \cdot X1 + A2 \cdot X2 \qquad \text{Equation (2)}$$

In Equation (2), A0 to A2 are coefficients, X1 is measured result information based on a measured value of the flow rate of a fluid flowing in pipes measured by the flow sensor 30a, and X2 is measured result information based on a measured value of a pH value of the fluid flowing in pipes measured by the pH sensor 30e.

The statistical processor 1012 reads the coefficients A0 to A2, the measured result information X1 based on the measured value of a flow rate, and the measured result information X2 based on the measured value of a pH value from the storage 104, and calculates the quality data Y of a product as a management index. The statistical processor 1012 causes the calculated management index Y to be stored in the storage 104. As a result, for example, a plant operator can ascertain a quality of a product by performing an output request from the terminal 80 and acquiring a management index Y.

As described above, according to the measuring system 1 according to the first embodiment and the measuring system 2 according to the second embodiment, since various types of sensors 30 (measuring devices) can be mounted on the main body of the field device 10 and the main body of the field device 11, it is possible to reduce costs for wiring between the main body of the field device and various types of sensors.

In the embodiments described above, a measuring target to be measured by the measuring system 1 and the measuring system 2 is a fluid, but the present embodiment is not limited thereto. The measuring target may be anything which can be measured by various types of measuring devices.

A portion or all of the field device 10 or the field device 11 in the embodiments described above may be realized by a computer. In this case, a program for realizing this control function is recorded in a computer-readable storage medium, and the program recorded in this storage medium may be realized by being read and executed by a computer system.

"Computer system" herein is a computer system built into the field device 10 or the field device 11, and includes an OS or hardware such as a peripheral device. "Computer-readable storage medium" refers to a portable medium such as a flexible disk, a magneto-optical disc, a ROM, or a CD-ROM, and a storage device such as a hard disk built into a computer system.

Furthermore, the "computer-readable storage medium" may hold a program dynamically for a short period of time like a communication line when the program is transmitted via a communication line such as a network like the Internet or a telephone line, and may hold the program for a certain period of time like a volatile memory in a computer system which is a server or a client in this case. The program may be a program realizing a portion of the functions described above, and may be a program capable of realizing the functions described above in combination with a program already recorded in the computer system.

In addition, a portion or all of the field device 10 or the field device 11 in the embodiments described above may be realized as an integrated circuit such as large scale integration (LSI) and the like. Each functional block of the field device 10 or the field device 11 may be individually formed into a processor, and some or all may be integrated into a processor. A method of forming an integrated circuit is not limited to an LSI, and may be realized by using a dedicated circuit or a general-purpose processor. When a technology of forming an integrated circuit substituting an LSI emerges due to advances in semiconductor technology, an integrated circuit based on such technology may be used.

What is claimed is:

1. A field device comprising:
   a plurality of types of sensors;
   at least one converter configured to acquire measured results of the plurality of types of sensors and to convert the measured results into measured information, the measured information being a physical quantity; and
   an information providing device comprising:
     at least one memory storing instructions; and
     at least one processor configured to execute the instructions to:
       acquire and store the measured information from the at least one converter; and
       provide the stored measured information to an outside of the field device in a case that a predetermined condition is satisfied,
   wherein
   at least one of the plurality of types of sensors is mounted on a ground ring, and
   a data input/output terminal is provided at a junction between a main body of the field device and the ground ring to allow the main body of the field device and the at least one of the plurality of types of sensors to be communicatively connected to each other.

2. The field device according to claim 1, wherein the information providing device comprises a communicator configured to provide the stored measured information to the outside of the field device by transmitting the stored measured information as a radio signal.

3. The field device according to claim 1, wherein the information providing device comprises an external input to which an external device is connectable.

4. The field device according to claim 1, wherein the at least one processor of the information providing device is configured to execute the instructions to:
   perform statistical processing using the acquired measured information; and
   provide statistical processing information based on a result of the statistical processing to an outside of the field device.

5. The field device according to claim 4, wherein the plurality of types of sensors comprise a first sensor and a second sensor, a type of the first sensor being different from the second sensor,
   the at least one converter comprises:
     a first converter configured to acquire a first measured result of the first sensor and to convert the first measured result into first measured information, the first measured information being a physical quantity; and
     a second converter configured to acquire a second measured result of the second sensor and to convert the second measured result into second measured information, the second measured information being a physical quantity, and the at least one processor of the information providing device is configured to execute the instructions to perform the statistical processing using the first measured information and the second measured information.

6. The field device according to claim 5, wherein the first sensor is a flow sensor and the second sensor is a temperature sensor.

7. The field device according to claim 6, wherein the at least one processor of the information providing device is configured to execute the instructions to perform a multiple regression calculation using the first measured information and the second measured information.

8. The field device according to claim 1, wherein the at least one processor of the information providing device is configured to execute the instructions to acquire the measured information of the plurality of types of sensors at the same time.

9. The field device according to claim 1, wherein the condition is that a predetermined time has arrived.

10. The field device according to claim 1, wherein the condition is that a predetermined period of time has elapsed.

11. The field device according to claim 1, wherein the condition is that an information transmission request from an outside of the field device has been received.

12. The field device according to claim 1, wherein the plurality of types of sensors comprise at least two of a flow sensor, a temperature sensor, a pressure sensor, a conductivity sensor, and a pH sensor.

13. An information providing method comprising:
acquiring measured results of a plurality of types of sensors provided in a field device;
converting the measured results into measured information, the measured information being a physical quantity;
storing the measured information; and
providing the stored measured information by an information providing device to an outside of the field device in a case that a predetermined condition is satisfied,
wherein at least one of the plurality of types of sensors is mounted on a ground ring, and
wherein a data input/output terminal is provided at a junction between a main body of the field device and the ground ring to allow the main body of the field device and the at least one of the plurality of types of sensors to be communicatively connected to each other.

14. The information providing method according to claim 13, wherein
providing the stored measured information to the outside of the field device comprises transmitting the stored measured information as a radio signal.

15. The information providing method according to claim 13, further comprising:
acquiring a measured result from an external device.

16. The information providing method according to claim 13, further comprising:
performing statistical processing using the measured information; and
providing statistical processing information based on a result of the statistical processing to an outside of the field device.

17. The information providing method according to claim 13, wherein
storing the measured information comprises acquiring the measured information of the plurality of types of sensors at the same time and storing the acquired measured information.

18. The information providing method according to claim 13, wherein
the condition is that a predetermined time has arrived.

19. The information providing method according to claim 13, wherein
the condition is that a predetermined period of time has elapsed.

20. The information providing method according to claim 13, wherein the condition is that an information transmission request from an outside of the field device has been received.

* * * * *